Figure 1:
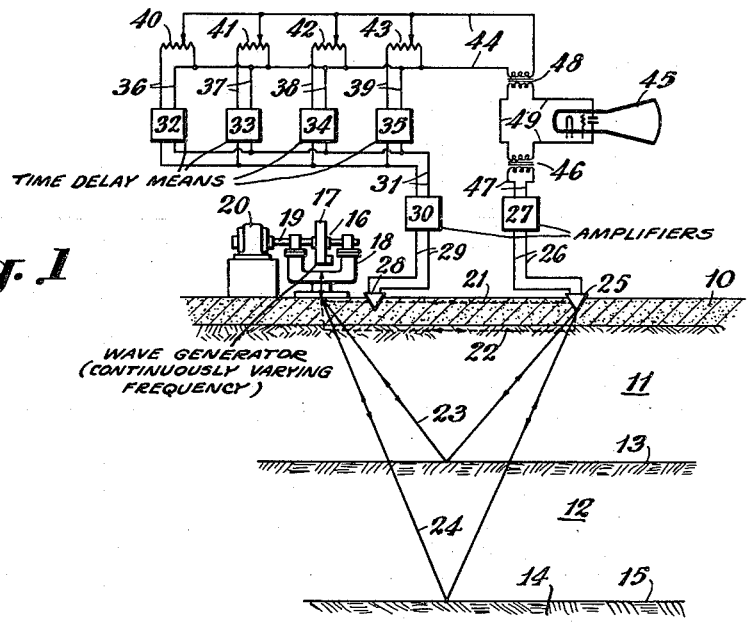

March 10, 1942.

R. T. CLOUD 2,275,735

METHOD AND APPARATUS FOR DETERMINING DISTANCES
OF ELASTIC DISCONTINUITIES

Filed June 23, 1939

INVENTOR
Raymond T. Cloud
BY Clarence H. Seeley
ATTORNEY

Patented Mar. 10, 1942

2,275,735

UNITED STATES PATENT OFFICE 2,275,735

METHOD AND APPARATUS FOR DETERMINING DISTANCES OF ELASTIC DISCONTINUITIES

Raymond T. Cloud, Tulsa, Okla., assignor to Stanolind Oil and Gas Company, Tulsa, Okla., a corporation of Delaware Application June 23, 1939, Serial No. 280,790

10 Claims. (Cl. 181—0.5)

This invention relates to the determination of distances by means of elastic waves, and more particularly to the determination of the distances of elastic discontinuities from a source of continuous seismic or acoustic waves. Still more specifically, my invention relates to the measurement of the periods of time required for such waves to travel through an elastic medium to one or more discontinuities therein and be reflected back to a suitable point of reception.

My invention is adapted for use in a variety of operations, such as the acoustical determination of the altitude of an airplane or the like above the earth, the measurement of the depth of a body of water at various points, etc. It is particularly applicable, however, to the more complex art of subsurface seismic prospecting, and will therefore be described in detail in that connection.

In seismic prospecting use is made of various refractions and reflections of elastic waves traveling through the formations of the earth. In the past, the best known method of seismic investigation has included the steps of creating a sharp pulse of seismic energy near the surface of the earth, usually by the detonation of a charge of explosive, and receiving and recording the resultant waves impinging on seismometers at certain spaced points on the surface of the ground. From a knowledge of the appearance of certain patterns of waves on the record, it is possible to identify, with more or less difficulty, the waves which have been reflected back to the surface from elastic discontinuities, and by determining in some way the average velocity of the particular waves involved, it is possible to compute the depths of the various reflecting horizons.

This method has a number of disadvantages. Since charges of explosive are employed, there is always danger to some of the workmen and to the property on which the work is carried out. Second, intermittent disturbances, such as the movements of animals, passage of trains, automobiles, etc., give rise to extraneous seismic waves which are recorded and which confuse the interpreter. Third, the normal record is interpretable only by a skilled computor, whose results are often subject to question as they involve judging which of a large number of recorded waves are true reflections. Finally, the whole apparatus is complicated and cumbersome, and requires a large force of men for operation.

I have devised an improved method and apparatus for seismic prospecting whereby these disadvantages are eliminated and new advantages are obtained. My invention utilizes a continuous source of seismic waves, so that the hazards incident to the use of explosives are entirely absent. Another feature of my invention lies in the fact that no intermittent source of seismic energy can cause a halt in exploration. Still another advantage of my invention over prior methods is that much less skill in operation and less equipment are necessary, and yet results are obtained in such a form that involved study of records is eliminated.

Figure 2:
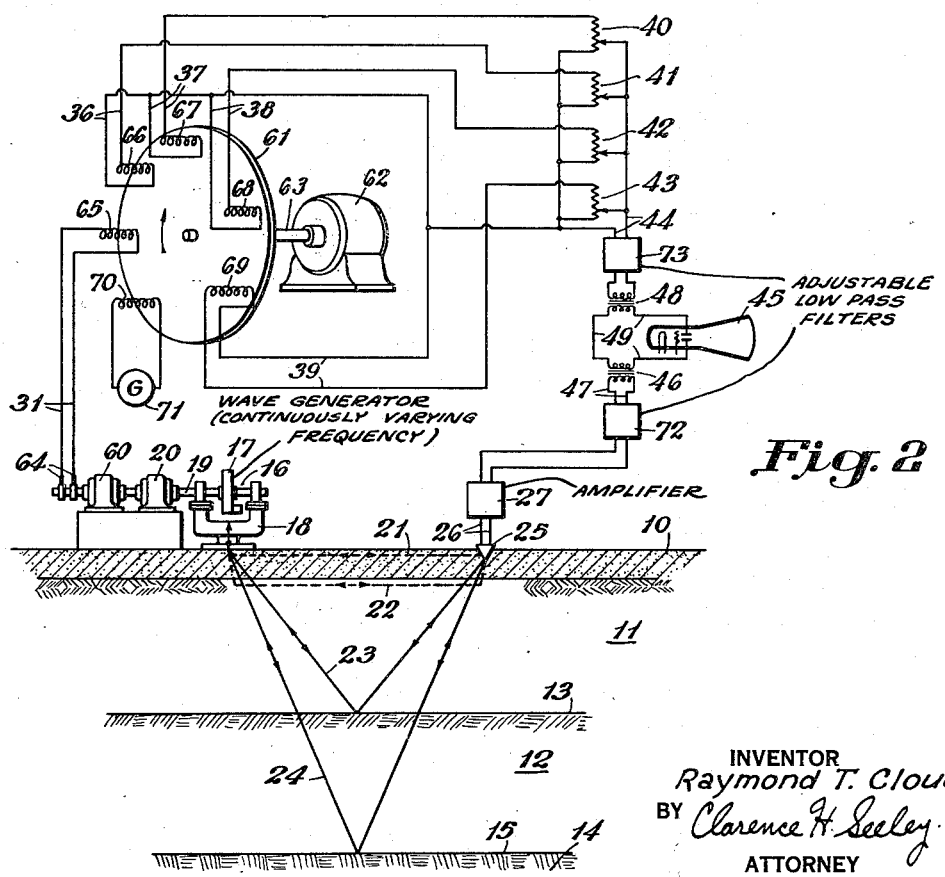

It is therefore an object of my invention to provide an improved method of determining the distances of elastic discontinuities which is simple in operation and gives the desired information with a minimum of uncertainty. Another object is to provide a system of seismic prospecting which utilizes a continuous source of seismic waves in the most advantageous manner to determine the depth of reflecting underground strata. A further object is to provide a seismic surveying method which is free from any hazard to persons or property. Still another object is to provide relatively simple apparatus for steady state seismic prospecting which is not sensitive to seismic waves of extraneous origin. Further objects and advantages of my invention will be apparent from the following description read in conjunction with the drawing, in which:

Figure 1 shows a diagrammatic cross-section of an idealized portion of the earth's crust together with a schematic representation of one form of apparatus according to my invention and the paths of the seismic waves generated and utilized in carrying out a prospecting operation; and Figure 2 is similar to Figure 1, but illustrates a modified form of apparatus according to my invention.

In one of its broadest aspects my invention comprises the continuous generation of waves of varying frequency at one point in an elastic medium such as air, water or the earth, receiving waves including those reflected from an elastic discontinuity at a second, associated point, converting the waves received into corresponding electrical variations, comparing these electrical variations by suitable indicating means with a set of electrical waves corresponding to the generated seismic waves, and modifying the electrical waves in the set as to time and amplitude until the modified waves are substantially the same as the electrical variations. This procedure in effect results in the balancing out of the reflected waves and any refracted and direct waves which may be present by means of a set of waves having the same frequency variations, each of the wave trains in the set being adjusted to give the amplitude and time lag of one component of the received waves. The distance of the reflecting discontinuities can then be determined very easily from the time lags imposed upon the electrical waves which balance out the electrical variations due to the reflected elastic waves.

My invention can best be understood, however, from the consideration of a specific embodiment thereof, such as that illustrated in Figure 1 of the drawing. In Figure 1 a diagram of a cross-section of the earth is shown in which a loose weathered formation 10 extends below the surface to the topmost consolidated layer 11. Below this are other strata, such as formation 12 with an upper interface 13, and formation 14 with an upper interface 15. For purposes of this illustration interfaces 13 and 15 are assumed to be capable of reflecting seismic waves. A source of continuous seismic waves 16, which is shown by way of example as a vibrator, is set up at some point on the surface of the earth and is arranged so that the frequency of the generated waves is not constant, but varies as any arbitrary function of time. Essentially vibrator 16 as shown in Figure 1 is made up of an unbalanced rotating flywheel 17 supported in a journaled support 18 which rests or is firmly attached to the ground, the shaft of flywheel 17 being rotated at a non-constant rate by shaft 19 driven by motor 20. Alternatively vibrator 16 can be driven by a non-constant speed gasoline engine or cranked at an uneven rate by hand.

It is obvious that rotation of the unbalanced weight sets up a vibration in the support 18 which in turn is transmitted to the ground, where it sets up seismic waves. These waves propagate in all directions from the source, and are refracted and reflected at elastic discontinuities in the ground, as is well known to those working in this field. Four typical wave paths have been indicated in Figure 1. One portion of the seismic energy generated is transmitted along the surface of the ground, on a path such as is shown by dotted line 21. A second portion traverses the longer path shown by dotted line 22, being refracted due to the relatively great velocity of the waves in formation 11 as compared with weathered layer 10. A third portion follows the path 23 and is reflected from interface 13, while a fourth portion follows path 24 and is reflected from interface 15. The reflecting interfaces are of course normally much deeper than the scale of the drawing would indicate.

Seismometer 25 is placed in contact with the ground at a considerable distance, e. g. 100 feet or more, from vibrator 16, so that it will be vibrated by these waves. Preferably seismometer 25 is of the electro-mechanical type, generating electric waves in response to the vibrations of the ground. These electric waves are conducted by cable 26 to amplifier 27, which can be any of the well-known types and preferably has an adjustable gain. It should introduce little or no distortion into the amplified signals.

A second, or reference seismometer 28 is placed relatively close to vibrator 16, so that the potential across its output terminals is substantially in phase with the seismic waves generated thereby, and so that there is a fixed relation between these, and the amplitude of the electric signals produced by seismometer 28. These last signals are conducted by electric cable 29 to amplifier 30, which is identical in phase and amplitude characteristics to amplifier 27 and also has adjustable gain. The output of amplifier 30 goes to the input of a number of time-delay devices by means of cable 31. These devices may be electrical networks, or mechanical-electrical instruments, which have the characteristics of delaying a signal a certain adjustable period of time without substantially altering its shape. As shown in Figure 1, time-delay devices 32, 33, 34 and 35 are connected to cable 31 in parallel so that a set of electrical waves each of which corresponds to the seismic waves generated by vibrator 16, but lags by a desired period of time, is produced. The output of each time-delay device is fed by cables 36, 37, 38 and 39, respectively, into an adjustable attenuating network such as a T or H pad or a potentiometer so that the amplitude of each wave train can be individually controlled. The attenuating network is illustrated simply as a number of voltage dividers 40, 41, 42 and 43 which receive the waves in cables 36, 37, 38 and 39, respectively, and deliver them at desired reduced voltages in parallel to cable 44. The waves in cable 44 therefore represent the sum of a number of waves, each of controlled amplitude and each having a definite adjustable time lag with respect to the seismic waves produced by vibrator 16.

The output of amplifier 27 and the combined output from the time-delay and attenuating devices are coupled in opposition to an indicating device 45, which is illustrated by way of example as a cathode-ray oscilloscope, in such a way that there is little or no effect of these two sources of waves upon each other. This can be done in a number of ways, for instance by supplying the output of amplifier 27 to the primary coil of transformer 46 by means of cable 47, connecting cable 44 across the primary coil of transformer 48 and connecting the secondary coils of transformers 46 and 48 in series but in opposition to oscilloscope 45 by conductor 49. Since the two electrical waves are connected in opposition, the oscilloscope image will show a signal which is the difference between the potentials across transformers 46 and 48 at any given time.

In carrying out a prospecting operation using the apparatus of Figure 1 the unbalanced flywheel 17 is rotated by motor 20 at a varying rate of speed, which may be arbitrarily chosen and does not need to be any particular function of time. For convenience in operation it is advantageous to have the variation in speed cyclical, but this is not necessary. The rotation of flywheel 20 imparts a varying force to the ground upon which it is placed, thus generating seismic waves. As mentioned previously, one set of waves will be transmitted, roughly, along the surface of the ground as indicated by path 21. The velocity of propagation of the seismic waves in this medium is relatively low, normally of the order of 1000 feet per second, so that there will be a definite time delay between the time one particular wave was generated by vibrator 16 and the time that that same wave reaches seismometer 25. The wave traveling along path 22 proceeds downward until it strikes the bed rock 11 at the base of the weathered layer 10, then travels along at the top of the bed rock and finally is refracted up through the weathered layer to strike seismometer 25. Usually the velocity of seismic waves in this bed rock is very much higher than in the weathered layer above, so that, although this path is longer than path 21, the time lag between the time a particular wave is generated by vibrator 16 and the time that it arrives at seismometer 25 along path 22 is usually less, or, more generally speaking, is different from that for the more direct path 21. In the same way it can be shown that there is a definite time lag associated with each wave reflected from various elastic discontinuities along paths such as paths 23 and 24 which, in general, is different from the time lags associated with paths 21 and 22. If vibrator 16 were operated at a constant speed the waves sent out by it would be approximately sinusoidal and the waves arriving at seismometer 25 would add up to give another sinusoidal wave which would be out of phase with the generated wave due to the time lags along the various paths. However, this phase difference is not a unique function of the formations encountered because there are numerous combinations of wave traveling paths such as 21, 22, 23 and 24 which would give precisely the same phase difference, although the individual time lags for each wave path might be different.

This situation cannot occur when operating vibrator 16 at a varying speed. The various seismic wave trains generated will no longer be of a fixed frequency and the resultant of the waves arriving at seismometer 25 will not be a wave similar in shape at all times to that sent out by vibrator 16. However, if the wave sent out by vibrator 25 (which is picked up by seismometer 28 substantially as produced) be divided into wave components and each component be delayed a time exactly the same as the time delay of one of the paths previously mentioned, and further, if each such component be attenuated until its amplitude is exactly the same as the amplitude of the particular wave train arriving at seismometer 25 along the particular path for which the time delay has been adjusted, the resultant of these components will be precisely the same in amplitude and will have the same variation with time as the waves striking seismometer 25. Thus if these adjustments are made on the time delay devices 32, 33, 34 and 35, and attenuator circuits 40, 41, 42 and 43, it is possible to balance exactly the resultant wave from seismometer 25 across coupling transformer 46 with a similar wave across transformer 48. In this case oscilloscope 45 will show no deflection. If the time-delay and attenuating devices are not so adjusted, it is impossible for the output from the attenuators to balance exactly the output from the seismometer amplifier 27 at all instants of time. Inasmuch as each of the waves through the earth is of varying frequency, it is impossible for it to add up with the other components in such a way that one will obtain the same waves at seismometer 25 for two different locations in which the ground formations are arranged differently.

It will be seen from the above description that I balance the response of a seismometer resting on the earth and actuated by seismic waves from a vibrator of varying frequency against the response from a device which corresponds to a "dummy" earth, so that after adjustment of the constants of the "dummy" earth until the oscilloscope 45 shows substantially perfect balance, I can read off from the delay mechanisms the actual travel-time of the various waves through the earth, and from the attenuator settings determine the relative attenuation of these waves. By a knowledge of the average velocity of seismic waves to the various reflecting horizons which can be obtained in any of the methods well known to the art, such as "well shooting," I can compute from the various travel times the depths to the various beds and from this knowledge can determine the dip of the various structures.

It is not absolutely necessary to obtain a perfect balance on the oscilloscope screen. It is possible to operate by adjusting the time delay devices, using only a coarse adjustment of the amplitude controls, until a definite minimum is obtained on the oscilloscope screen. If this type of operation is carried out, the various travel-times of the seismic waves can be obtained as accurately as before, and from them the corresponding lengths of path. The attenuation along each wave path is not obtained, but this can be dispensed with in many cases.

Though it is not always easy with the simple setup described to determine which of the travel times are due to reflected waves, it is always easy to determine this fact by moving seismometer 25 a short distance from its original position, say 100 feet, and re-determining the various travel times. The travel times of waves following the relatively direct paths 21 and 22 will increase roughly linearly with the distance from vibrator 16, while the travel time of the reflected waves will increase only slightly.

Various modifications of the above simple embodiment can be made without departing from the spirit of my invention, and some of these are shown in Figure 2, which is similar in operation to the apparatus of Figure 1 and has many corresponding elements, which are given like reference characters. Referring now to Figure 2, in place of a reference seismometer, an electric generator 60 is coupled to the shaft of motor 20 and the position of the poles and coils is so adjusted that the electric output thereof is exactly in time phase with the seismic waves generated at the base of vibrator 16. I can then operate upon this electric output with the time-delay and attenuator devices directly, and no amplifier is necessary.

As stated above, I can use any type of time-delay device, such as electrically long transmission lines, acoustical tubes or other electromechanical systems, which will produce a relatively distortion-free time delay in a set of electrical signals. A particularly advantageous time-delay device is the magnetic disc instrument shown in Figure 2, which consists essentially of a metallic disc 61 driven at a constant speed by motor 62 and shaft 63, and a number of coils suitably arranged adjacent the outer edge of disc 61 so that they all are in a magnetic relation with the same annular portion of the disc as it rotates. The electric current produced by generator 60 is supplied through sliding contacts 64 and cable 31 to coil 65. The electrical variations in coil 65 produce a magnetized annular path on disc 61 as it rotates in a manner known in the art, the magnetic variations corresponding to the inducing impulses or variations. This magnetic path then comes into magnetic relation with pick-up coils 66, 67, 68 and 69 in that order, so that electrical waves are produced in each of these coils similar in form to those in coil 65 and therefore similar in form to the seismic waves generated by vibrator 16. Obviously, however, the waves in pickup coils 66, 67, 68 and 69 will lag by the time required for a particular portion of the magnetic record to move the distance from coil 65 to the respective pickup coils. The pickup coils are arranged so that this distance can be varied at will to produce any desired time lag in the waves in each of the coils. In order to eliminate the previous magnetic record from disc 61 before subjecting it to the influence of coil 65, an obliterating unit is necessary, and this is shown by way of example as a coil 70 fed with alternating current at high frequency supplied by generator 71.

In carrying out a prospecting operation using the above-described type of time-delay device, the position of pickup coil 66 is adjusted so that the time lag of the waves induced therein is equal to that of the seismic waves reaching seismometer 25 by refracted path 22, that of coil 67 to give a time lag equal to that of direct path 21, and that of coils 68 and 69 to give time lags equal to those of the waves following reflected paths 23 and 24, respectively, these adjustments being made with the aid of oscilloscope 45 as previously described in connection with Figure 1. The values of these time lags are determined from the final positions of the respective pickup coils and are used in the usual manner to determine the depth of the various reflecting formations.

It is occasionally advantageous in balancing the "dummy" earth to insert identical adjustable low pass filters 72 and 73 before the transformers 46 and 48. These filters are used in the early stages of preliminary balancing and as the amplitude of the waves on oscilloscope 45 becomes small, are progressively cut out until they are finally uneffective.

Numerous further modifications can be made in accordance with the spirit of my invention. For instance, I can incorporate an amplifier to amplify the difference of the outputs of transformers 46 and 48 before applying this potential to the oscilloscope plates. The particular type of coupling that is shown between the two electrical wave trains and the cathode-ray oscilloscope 45 need not be transformer coupling, but can be any of the other well-known types. Also other visual indicating devices can be used instead of a cathode-ray oscilloscope, for example a vacuum tube voltmeter can be advantageously employed. It is obvious that several seismometers similar to seismometer 25 operating at varying distances from vibrator 16 can be used, utilizing either an associated "dummy" earth for each seismometer or using the same setup as shown in Figure 1 or Figure 2 but switching leads 26 to each of the seismometers in turn.

In applying this invention to the acoustical determination of the height of an airplane above the earth, certain modifications would be necessary, such as the substitution of a source of acoustic waves in air for the vibrator 18, change of seismometers 25 and 26 to microphones, etc. These changes are, however, so obvious to one skilled in the art that there is no need to describe them in any detail. The principle of the invention remains the same regardless of the medium in which the generated waves propagate.

It is also possible to operate successfully under my invention as applied to airplanes by using radio waves instead of sound waves. These waves will be reflected back from the earth to a receiver, and the amplified received waves applied to the oscilloscope and balanced out with a time-delay and attenuator network as above. In this case much shorter delay times will be found. Only one variable delay device need be used since a fixed-delay device can be used to cancel out the component of the emitted radio waves that travels directly from transmitter to receiver.

While I have described my invention in connection with certain specific embodiments thereof, I do not desire to be limited thereto, but only by the scope of the appended claims.

I claim:

1. The method of subsurface seismic surveying which comprises generating continuous seismic waves of continuously varying frequency in the earth, receiving the resultant waves travelling at least two different wave paths at a point removed from the source of said seismic waves, transforming said received seismic waves into corresponding electrical variations, producing electrical waves corresponding to said generated seismic waves, and modifying said electrical waves with respect to time and amplitude until said modified electrical waves are substantially the same as said electrical variations.

2. The method of subsurface seismic surveying which comprises generating continuous seismic waves in the earth, gradually and continuously varying the frequency of said generated seismic waves, receiving seismic waves reflected from at least one horizon and relatively direct seismic waves resulting from said generated seismic waves, transforming said reflected and relatively direct seismic waves into corresponding electrical variations, producing a set of electrical waves corresponding to said generated seismic waves, balancing said electrical variations against said set of electrical waves, and adjusting the time lag and amplitude of each of the electrical waves in said set so that said electrical variations and said set of electrical waves are substantially balanced out.

3. The method of subsurface seismic surveying which comprises generating continuous seismic waves in the earth, continuously varying the frequency of said generated seismic waves, receiving seismic waves reflected from at least one horizon and relatively direct seismic waves resulting from said generated seismic waves, transforming said reflected and relatively direct seismic waves into corresponding electrical variations, producing a set of electrical waves corresponding to said generated seismic waves, the number of electrical waves in said set corresponding to the number of said reflected and relatively direct seismic waves received, visually indicating a function of the difference between said electrical variations and said set of electrical waves, and adjusting the time lag and amplitude of each of the electrical waves in said set until the indicated difference between said electrical variations and said set of electrical waves is at a minimum, whereby the depth of the reflecting horizons can be calculated from the time lag imposed on the corresponding electrical waves in said set.

4. The method of seismic surveying which comprises generating continuous seismic waves in the earth, the frequency of said generated seismic waves being continuously varied, separately transforming seismic waves into corresponding electrical waves at two points at the surface of the earth, one of said points being adjacent the point at which said seismic waves are generated and the other of said points being relatively distant therefrom, dividing said electrical waves corresponding to seismic waves at said adjacent point into a plurality of portions, introducing an adjustable time lag and attenuation into each of said portions, combining said portions to form electrical waves corresponding to those which would be received at said relatively distant point if the earth had a given structure, coupling in opposition said last-mentioned waves and said electrical waves corresponding to the seismic waves actually received at said relatively distant point, observing the difference between said coupled waves, and adjusting the time lag and attenuation of each of said portions so that said difference is reduced to a minimum.

5. Apparatus for seismic surveying comprising means for generating continuous seismic waves in the earth having a continuously varying frequency, means for receiving reflected, refracted, and relatively direct seismic waves and transforming said waves into corresponding electrical variations, means for producing electrical waves corresponding to said generated seismic waves and means for modifying said electrical waves with respect to time and amplitude until said modified electrical waves are substantially the same as said electrical variations.

6. Apparatus for seismic surveying comprising means for generating continuous seismic waves of continuously varying frequency in the earth, at least one seismometer for receiving seismic waves reflected from underground strata and transforming said waves into corresponding electrical variations, means for generating electrical waves corresponding to said generated seismic waves, a plurality of adjustable time-delay devices adapted to produce a set of waves corresponding to said electrical waves but lagging a desired period of time, and means for indicating the difference between said electrical variations and said set of waves.

7. Apparatus according to claim 6 wherein said means for generating electrical waves corresponding to said generated seismic waves comprises a reference seismometer immediately adjacent said generating means.

8. Apparatus according to claim 6 wherein said means for generating electrical waves corresponding to said generated seismic waves comprises an electric generator actuated by said seismic wave generating means.

9. Apparatus according to claim 6 wherein said means for indicating the difference between said electrical variations and said set of waves includes a cathode ray oscilloscope.

10. Apparatus according to claim 6 including means for regulating the amplitude of each of the waves in said set.

RAYMOND T. CLOUD.